June 26, 1962 W. R. POLANIN ET AL 3,040,843
SELF-CONTAINED BRAKE ARRANGEMENT
Filed July 28, 1958 3 Sheets-Sheet 1

Witness:
Richard W. Carpenter

INVENTOR.
Walter R. Polanin
Matthew S. Andrzejewski.
BY Walter L. Schlegel, Jr.
Atty.

June 26, 1962  W. R. POLANIN ET AL  3,040,843
SELF-CONTAINED BRAKE ARRANGEMENT

Filed July 28, 1958  3 Sheets-Sheet 2

INVENTOR.
Walter R. Polanin
Matthew S. Andrzejewski
BY Walter L. Schlegel, Jr. Atty.

Witness:
Richard W. Carpenter

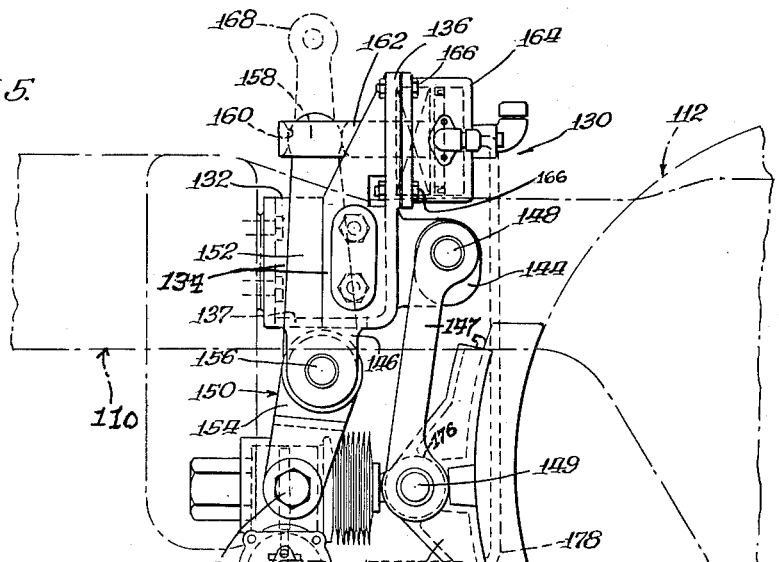

United States Patent Office 3,040,843
Patented June 26, 1962

3,040,843
SELF-CONTAINED BRAKE ARRANGEMENT
Walter R. Polanin and Matthew S. Andrzejewski, Chicago, Ill., assignors to Amsted Industries Incorporated, Chicago, Ill., a corporation of New Jersey
Filed July 28, 1958, Ser. No. 751,280
1 Claim. (Cl. 188—153)

This invention relates to brakes and more particularly to a self-contained brake arrangement adapted for application as a unit to a railway vehicle.

The invention comprehends an arrangement of the type wherein friction means, power means, and linkage interconnecting the friction and power means are all carried by a brake support which is detachably mounted on the frame of the vehicle.

It is an object of this invention to provide an improved self-contained brake arrangement of simple design and construction wherein the entire brake mechanism is carried by a brake support detachably mounted on a frame of the vehicle adjacent a wheel and axle assembly.

Another object of the invention is the provision of a self-contained unit brake arrangement including power means and slack adjusting means carried by the brake support.

A further object of the invention is to provide a self-contained brake arrangement wherein excess slack in the linkage can be taken up by changing the location of a pivotal axis of the brake lever relative to the brake support or the brake shoe assembly.

A more specific object of the invention is the provision of a self-contained brake arrangement including a brake support carrying a power cylinder, a dead brake lever, means connecting the lever to a brake shoe assembly, and means to fulcrum the lever for rotation about a pivotal axis fixed relative to the brake support.

These and other objects of the invention will be apparent from an examination of the following description and drawings, wherein.

Figure 1:
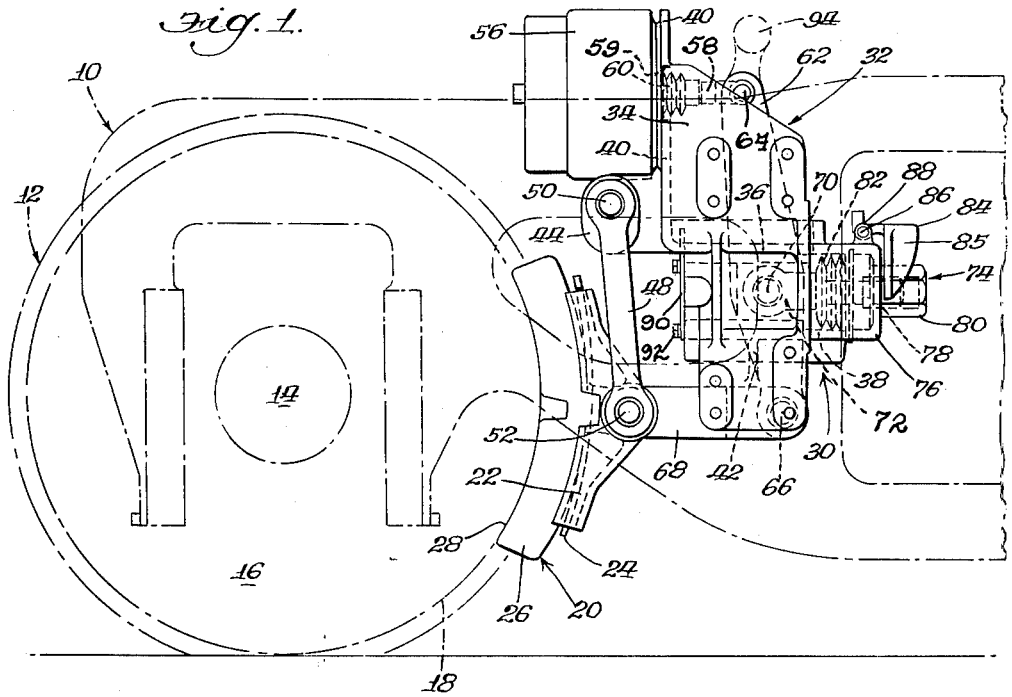
FIGURE 1 is a fragmentary side elevational view of a portion of a railway car truck to which has been applied a self-contained brake arrangement embodying features of the invention (only the brake arrangement associated with one wheel is shown as similar brake arrangements may be provided for the other wheels of the truck)

It will be understood that certain elements have been eliminated from certain views where they have been illustrated to better advantage in other views.

Referring now to the drawings for a better understanding of the invention, and particularly to FIGURES 1–4 of the drawings, it will be seen that the novel brake arrangement is shown as applied to a railway car truck comprising a frame, indicated generally at 10, supported on a pair of wheel and axle assemblies (only one of which is shown), indicated generally at 12. Each wheel and axle assembly comprises an axle 14 having secured thereto a pair of wheels 16 (only one of which is shown) each presenting a peripheral friction surface 18.

Disposed adjacent each wheel 16 is a brake shoe assembly 20 which may be of conventional design comprising a brake head 22 having detachably secured thereto in any manner, as by key 24, a brake shoe 26 presenting a friction surface 28 engageable with friction surface 18 of the related wheel 16.

Each brake shoe assembly 20 is urged into engagement with its related wheel by means of a combination power cylinder-slack adjuster assembly, indicated generally at 30.

Power cylinder-slack adjuster 30 includes a brake frame structure or support member, indicated generally at 32. The brake frame or support member 32 comprises a pair of transversely spaced, generally vertically extending side walls 34 (best seen in FIGURE 3), which are interconnected by a pair of preferably integrally formed, vertically spaced, horizontally extending upper and lower transverse walls 36 and 38, respectively. Side walls 34 may also be interconnected by a pair of preferably integrally formed vertically spaced and vertically extending upper and lower transverse walls 40 and 42 respectively. Support 32 includes a pair of preferably integrally formed lugs 44 extending outwardly from transverse wall 40 in a generally horizontal direction toward the related wheel 16.

Support 32 may be detachably mounted on the side of truck frame 10 by a plurality of nut and bolt assemblies 46 disposed to extend through apertures of the adjacent side wall 34. It will be noted that, as shown in FIGURE 2, support bracket 32 is generally symmetrical with both side walls 34 being adapted for mounting on either the left or right hand side of a truck frame.

Each brake shoe assembly 20 may be movably supported from support 32 by means of a double hanger or link 48 pivotally connected at its upper and lower ends by pins 50 and 52 to support lugs 44 and brake head 22, respectively.

Figure 2:
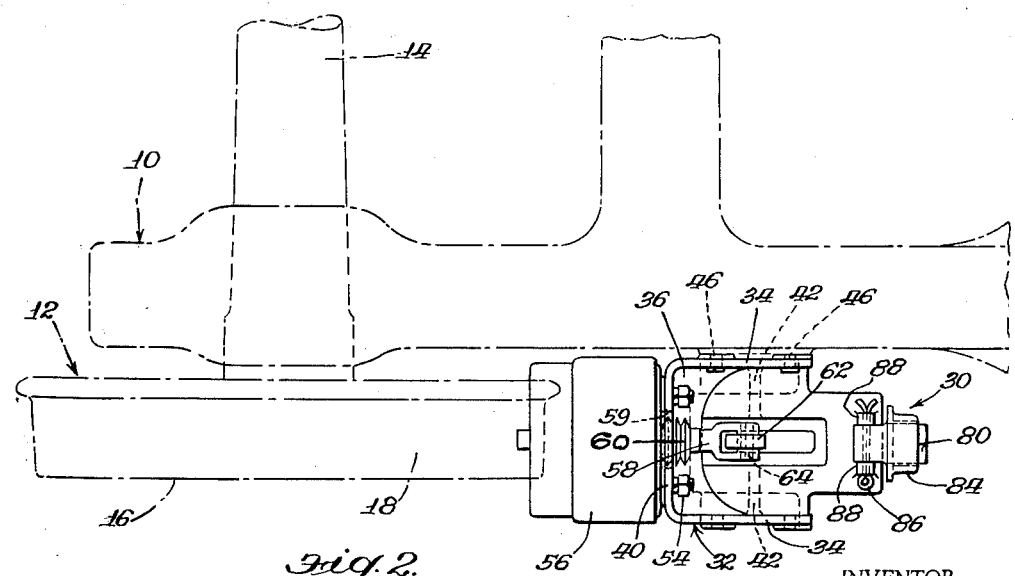
FIGURE 2 is a top plan view of the structure illustrated in FIGURE 1.
Figure 3:
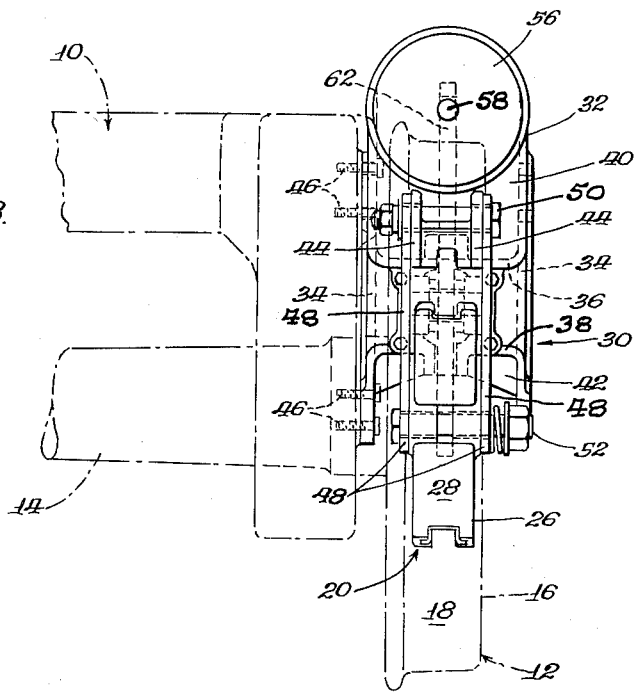
FIGURES 3 and 4 are left and right side elevational views, respectively, of the structure illustrated in FIGURE 1, and FIGURES 5–7 are views similar to views 1–3, respectively, but illustrate a modified form of the invention.
Figure 4:
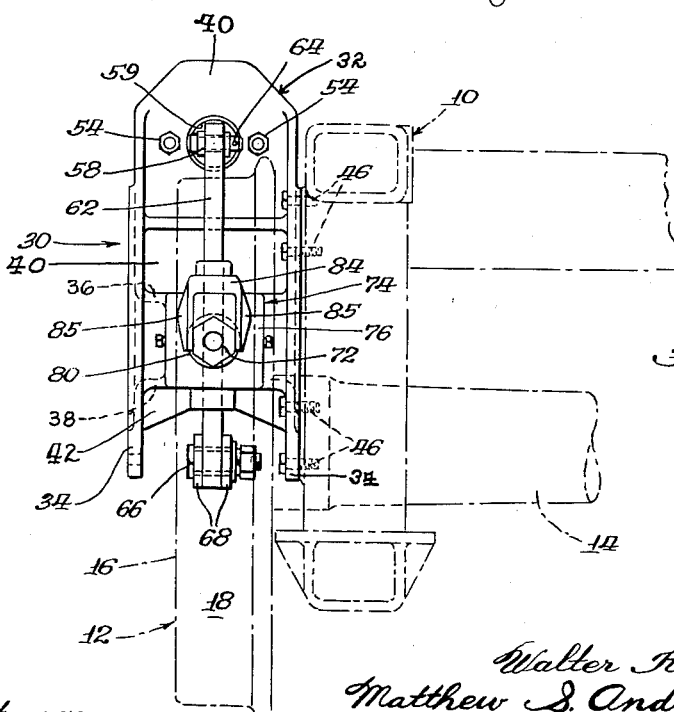

As best seen in FIGURE 2, there is secured to support wall 40 by a plurality of nut and bolt assemblies 54, a power cylinder housing 56 having a piston or push rod 58 extending outwardly therefrom through aperture 59 of wall 40. In order to effect a relatively tight closure so as to prevent dirt or other foreign matter from entering the power cylinder housing 56, there may be provided a rubber bellows type seal or boot 60 which is sleeved over piston rod 58.

The brake shoe assembly 20 of each brake arrangement is urged into engagement with its related wheel by means of a generally vertically extending dead brake lever 62 which may be pivotally connected at its upper end by pin 64 to the outer end of piston rod 58. At its lower end, brake lever 62 may be pivotally connected by pin 66 to one end of a compression link 68, the other end of which link is pivotally connected to related brake head 22 and hanger 48 by the common pivot pin 52.

Intermediate its ends, dead brake lever 62 may be fulcrumed to support 32 by means of a pin 70 which serves to pivotally interconnect the brake lever with one end of an adjusting screw 72 of a slack adjusting assembly 74 disposed within the pocket of a housing 76 preferably formed integrally with support 32. At its other end, adjusting screw 72 may be provided with a threaded portion disposed to extend through an aperture 78 of the slack adjuster housing. Axial movement of the screw longitudinally of the support 32, for the purpose of taking up excess slack in the linkage by adjusting the fulcrum point of lever 62 relative to the support, is accommodated by means of an adjusting nut 80 threadably received on the threaded end of screw 72. After the nut has been rotated to locate the brake lever fulcrum pin 70 in the proper position relative to the support 32, the nut may be retained in place by means of a generally bifurcated locking plate or clevis 84 having a pair of depending spaced arms 85 disposed to surround opposite sides of the locking nut. Locking plate 84 may be pivotally connected by pin 86 to a pair of lugs 88 upstanding from slack adjuster housing 76 so as to be free for manual rotation upward to permit the turning of adjusting nut 80. Inasmuch as the center of gravity of the locking plate is below the pivotal axis of pin 86, the force of gravity will normally maintain the locking plate in its downward or locking position.

In order to prevent dirt or other foreign matter from entering the slack adjuster housing 76, there may be provided a rubber bellows type seal or boot 82 sleeved over adjusting screw 70 so as to abut the housing on the side opposite from the adjusting nut. The opposite end of the slack adjuster housing may be closed by a removable cover plate 90, secured to the housing by a plurality of cap screws 92.

In operation, it will be understood that as the upper end of brake lever 62 is urged to the right (as seen in FIGURE 1) by power cylinder rod 58, the brake lever rotates in a clockwise direction about pivot 70 thereby moving compression link 68 and related brake shoe assembly 20 into engagement with the adjacent wheel. In order to adjust the fulcrum point of the brake lever and thereby take up slack in the linkage normally caused by wear of the brake shoe, locking plate 84 is lifted, adjusting nut 80 is rotated until the fulcrum pin 70 is in the desired location, and locking plate is dropped back into position.

If it is desired to provide a hand brake linkage for the system, this may be readily accomplished by the provision of an extension 94 formed integrally with or fixedly secured to brake lever 62 so as to project upwardly from the upper end thereof. Actuation of the brake lever may then be accomplished by an appropriate hand brake linkage arrangement connected to the brake lever extensions of the brake mechanisms associated with one or more of the wheels of the truck.

Now referring to FIGURES 5-7 of the drawings, it will be seen that there is illustrated therein a modified form of the invention. The arrangement in this embodiment is also shown as applied to a railway car truck frame 110, supported on a pair of wheel and axle assemblies (only one of which is shown), indicated generally at 112. Each wheel and axle assembly comprises an axle 114 having secured thereto a pair of wheels 116 (only one of which is shown) each presenting a peripheral friction surface 118.

Disposed adjacent each wheel 116 is a brake shoe assembly 120 which may be of conventional design comprising a brake head 122 and a brake shoe 126 presenting a friction surface 128 engageable with friction surface 118 of the related wheel 116.

Each brake shoe assembly 120 is urged into engagement with its related wheel by means of a combination power cylinder-slack adjuster assembly, indicated generally at 130.

Power cylinder-slack adjuster 130 includes a brake frame structure or support member, indicated generally at 132. The brake frame or support member 132 comprises a pair of transversely spaced vertical side walls 134 interconnected by a pair of preferably integrally formed transversely extending vertical and horizontal walls 136 and 137, respectively. The support may be detachably mounted to the truck frame 110 by means of nut and bolt assemblies 138 disposed to extend through the outboard side wall 134 and the adjacent longitudinally extending member 139 of truck frame 110 and also by means of other nut and bolt assemblies 140 disposed to extend through an inboardly projecting flange 141 preferably formed integrally with the inboard side wall 134 and a transversely extending member 142 of truck frame 110. Walls 136 and 137 may be provided with preferably integrally formed forwardly and downwardly extending pairs of lugs 144 and 146, respectively.

As best seen in FIGURE 5, brake shoe assembly 120 may be supported from the brake frame 132 by means of a double hanger 147 pivotally connected at its upper and lower ends by pins 148 and 149 to brake support lugs 144 and brake head 122, respectively.

The brake shoe assembly 120 of each brake mechanism is urged into engagement with its related wheel by means of a generally vertically extending dead brake lever 150 which comprises an upper arm 152 bifurcated adjacent its lower end to provide a pair of depending spaced arms 154. The brake lever may be fulcrumed to the support by means of a fulcrum pin 156 disposed to extend through upper arm 152 of the brake lever and through brake support lugs 146.

At its upper end, the brake lever may be provided with a rounded head or boss 158 disposed within a slot 160 presented by one end of a piston rod 162, the other end of which extends through an aperture in brake support wall 136 and is connected to a fluid pressure actuated power cylinder piston (not shown in detail) disposed within a power cylinder housing 164 secured to the brake support vertical wall 136 by means of nut and bolt assemblies 166. If desired, brake lever 150 may be provided with an extension 168 formed integrally with or fixedly secured to the brake lever so as to project upwardly from the upper end of the lever in order to accommodate actuation of the lever by a hand brake linkage (not shown).

As best seen in FIGURE 7, a floating automatic slack adjuster assembly indicated generally at 170 is carried by the lower end of brake lever 150. The slack adjuster assembly includes a housing 172 which may be pivotally connected to the lever by means of a pair of pins 174 disposed to extend through the respective arms 154 of the lever and into the housing 172 which is interposed between the arms.

The construction of the slack adjuster assembly 170 will not be described in detail inasmuch as it is not an essential feature of this invention and may be of any appropriate type such as that described in detail in co-pending application, Serial No. 730,353, now U.S. Patent No. 2,974,757, filed in the name of Walter R. Polanin.

The slack adjuster assembly includes an adjustable screw 176, the free end of which is pivotally connected to the lower end of hanger 147 and the related brake head 122 by means of the common pivotal pin 149. The power cylinder housing 164 and slack adjuster housing 172 may be interconnected by a flexible piping means indicated generally at 178 affording means for the transfer of brake actuating pressure fluid therebetween so the position of slack adjuster screw 176 can be automatically controlled by the slack adjuster assembly 170 responsive to the movement of the power cylinder piston within housing 164 in a manner similar to that described in detail in the above referred to co-pending application.

In operation, it will be understood that as brake lever 150 is actuated, either by piston rod 162 or by hand brake linkage (not shown) the upper end of the lever will be urged to the left, as seen in FIGURE 5, causing the lever to rotate in a counter-clockwise direction about fulcrum pin 156 and thereby move the slack adjuster assembly and connected brake shoe assembly into engagement with the related wheel.

Although the first described embodiment of this invention is provided with manual slack adjusting means, whereas the second described embodiment is provided with automatic slack adjuster means, it will be understood that either embodiment may be provided with either manual or automatic slack adjusting means depending upon the particular application for which the device is intended.

I claim:

A self-contained brake arrangement for application as an integral mechanism to a railway vehicle having a frame and a supporting wheel and axle assembly, comprising in combination: a unitary brake support member detachably mountable on the frame for supporting all the parts of said mechanism; a friction member including a brake head for the support thereof disposed for engagement with said assembly; a power device mounted on the support member; a generally vertically extending dead brake lever; means connecting the dead brake lever directly to the power device; means fulcruming the dead brake lever to the support member; said fulcruming means comprising a slack adjusting device operable to regulate the location of the fulcrum point of the lever relative to the support member; a generally vertically extending dead linkage member pivotally secured only at its opposite ends directly to said brake head and said support member, respectively, in order to provide vertical stability to said friction member and brake head when said friction member is brought into engagement with said assembly; and a generally horizontally disposed linkage member pivotally secured only at its opposite ends directly to said dead brake lever and to the brake head, respectively; said vertically extending dead linkage member and said horizontally disposed linkage member being pivotally connected to said brake head by means of a common pivot member.

References Cited in the file of this patent

UNITED STATES PATENTS

| | | |
|---|---|---|
| 433,412 | Lawrence | July 29, 1890 |
| 457,544 | Dobbel | Aug. 11, 1891 |
| 696,525 | Wahlert | Apr. 1, 1902 |
| 866,279 | Jenkins | Sept. 17, 1907 |
| 1,466,452 | Lipcot et al. | Aug. 28, 1923 |
| 2,001,239 | Buckendale | May 14, 1935 |
| 2,118,236 | Schwentler | May 24, 1938 |
| 2,848,071 | Holin | Aug. 19, 1958 |
| 2,913,071 | Mueller | Nov. 17, 1959 |
| 2,940,553 | Newell et al. | June 14, 1960 |

FOREIGN PATENTS

| | | |
|---|---|---|
| 778,177 | Great Britain | July 3, 1957 |